United States Patent [19]
Embling et al.

[11] 3,742,494
[45] June 26, 1973

[54] INFORMATION DISPLAY ARRANGEMENTS

[75] Inventors: Clifford Arthur Embling, Buckhurst Hill; Alban Harrison, Woodford Green, both of England

[73] Assignee: Smiths Industries Limited, London, England

[22] Filed: May 21, 1971

[21] Appl. No.: 145,842

[30] Foreign Application Priority Data

May 22, 1970 Great Britain.................24862/70
May 22, 1970 Great Britain.................24863/70

[52] U.S. Cl. ............... 343/5 R, 343/5 ST, 343/6 R, 343/6 TV
[51] Int. Cl............................................ G01s 7/26
[58] Field of Search............ 343/5 LD, 5 ST, 5 MM, 343/6 TV, 5 EM

[56] References Cited
UNITED STATES PATENTS

| | | | |
|---|---|---|---|
| 3,109,060 | 10/1963 | Beach et al. ....................... | 343/5 ST |
| 3,212,086 | 10/1965 | Robinson ....................... | 343/5 ST X |
| 2,804,613 | 8/1957 | Haworth........................... | 343/5 ST |
| 2,506,127 | 5/1950 | Allen............................ | 343/6 TV X |
| 2,597,636 | 5/1952 | Hall et al........................ | 343/5 CD |
| 3,191,172 | 6/1965 | Watt................................ | 343/5 ST |
| 3,550,123 | 12/1970 | Brown............................. | 343/6 TV |

OTHER PUBLICATIONS

"Studies of the Mechanism of the Thorn Image–Retaining Panel" by G. F. J. Garlick et al., British Journal of Applied Physics, 1969, Series 2, Vol. 2, pp. 501–508, Apr. 1969.

Primary Examiner—Malcolm F. Hubler
Attorney—William D. Hall, Elliott I. Pollock, Fred C. Philpitt, George Vande Sande, Charles F. Steininger and Robert R. Priddy

[57] ABSTRACT

A ship's radar includes an electrically-energized image-retaining panel that is exposed continuously to a relative-motion plan-position echo-display on a cathode-ray-tube screen via a relay lens and a frequency-selective optical filter so as to retain images of the display superimposed upon one another. The panel, which displays the cumulatively-retained images in light of a different wavelength from that emitted by the cathode-ray-tube screen, is moved along coordinate axes relative to the cathode-ray tube in accordance with the ship's North-South and East-West components of motion, and is scanned by a stationary television camera using reflection from the frequency-selective optical filter. The cathode-ray-tube display is projected on to the panel through the filter, and the video signals derived by the camera are applied to a television monitor to provide a bright plan-position picture in which only moving-objects have rearwardly-extending true-track 'tails', and the ship itself always appears at the center. Electrical energization of the panel is interrupted periodically to erase the historical record, and the panel is primed to a highly light-sensitive state each time the energization is restored, by a procedure of first flooding it with light transitorily and then reducing the applied voltage transitorily.

24 Claims, 3 Drawing Figures

Patented June 26, 1973

Clifford Arthur Embling
Alban Harrison
Inventors by
Attorney

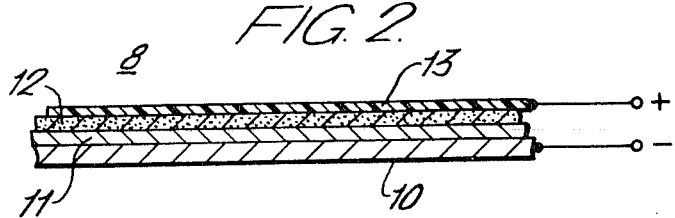
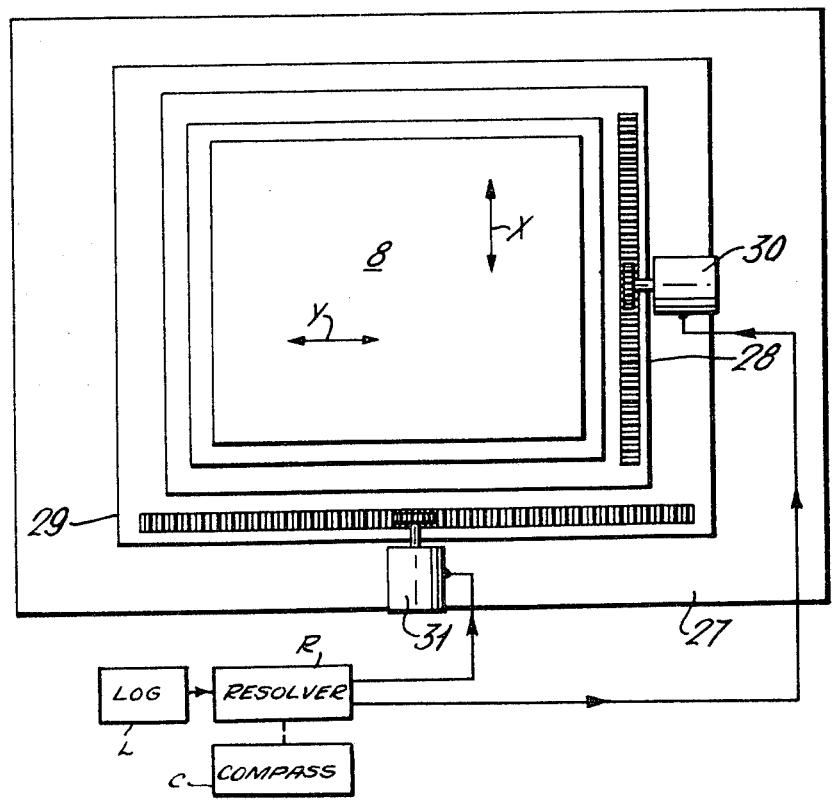

INFORMATION DISPLAY ARRANGEMENTS

BACKGROUND OF THE INVENTION

This invention relates to display apparatus and especially to display apparatus for displaying information that varies with time.

The invention is particularly, though not exclusively, applicable to information display arrangements for use in radar and other echo-responsive systems to provide a composite display, for example, a plan-position display, of craft or other 'targets' within the area of surveillance.

Apparatus for use in display of radar information is described in co-pending U.S. Pat. application Ser. No. 119,788 filed 1st Mar. 1971 in the name of Clifford A. Embling. This earlier-described apparatus utilizes an image-retaining panel to retain in display superimposed images of a radar plan-position display provided on the screen of a cathode-ray tube. The panel is exposed intermittently to the cathode-ray-tube screen so that it retains successive time-spaced images of the plan-position display superimposed upon one another, being for this repeatedly pivotted up into face-to-face contact with the screen. The historical plan-position information consequently built up in the panel display through a period of repeated exposure to the cathode-ray-tube screen is viewed as superimposed on the current plan-position information provided on the screen and is utilized as an aid to interpretation of the current information.

It is one object of the present invention to provide information display apparatus in which the need for repeated movement of the image-retaining device into face-to-face contact with a cathode-ray tube or other display means is avoided.

SUMMARY OF THE INVENTION

According to one aspect of the present invention in this respect, information display apparatus comprises display means for providing a time-variable display-representation in accordance with input information, an image-retaining device operative to provide a retained light-pattern display in the image of light incident thereon, means mounting the image-retaining device for exposure to the said time-varying display-representation to retain in display a cumulative time-integrated image of said display-representation, and viewing means operative to exhibit said cumulative time-integrated image while the image-retaining device is exposed to said display-representation so as to present for view a display dependent on said information as both currently and previously applicable.

The display representation provided by the display means need not be in a form that is visible as a whole to the human eye, and in this respect the display means may act simply as a source of light that is scanned across a surface of the image-retaining device and is modulated in intensity in accordance with the information to be displayed. In the latter respect therefore, where the display means is a cathode-ray tube used for example to present a plan-position display, it is not necessary for the tube to have as long a persistence as in the case where its display representation is to be viewed directly by the eye.

It may be arranged that light from the display means passes through a partially-transparent reflector in its path to the image-retaining device, and that the image retained by the image-retaining device is viewed by reflection from the reflector. However the opposite mode may apply, that is to say, the retained image may be viewed through the reflector and irradiation take place by reflection. The light emitted by the display means may be of a different wavelength from that emitted by the image-retaining device and in these circumstances the reflector preferably has the characteristics of a filter to pass the light emitted by the display means and reject that emitted by the image-retaining device, or vice versa, depending on the mode of use of the reflector.

The image-retaining device used in the arrangements of the present invention may be of a form in which a layer of material containing electroluminescent material and interposed between a pair of electrodes, has the characteristic while unidirectional voltage is applied between the electrodes of emitting light in dependence upon earlier irradiation of the layer. The image-retaining device used in the radar system of the above-mentioned co-pending patent application is of this form, and one difficulty experienced with it in this context is that is does not provide efficient visible response to irradiation until a significant period after the unidirectional voltage has been applied between the electrodes. In general there is an initial stage after application of the voltage during which retention and display by the device is so poor that satisfactory and continued light emission from any area of the electroluminescent-embedded layer can be achieved only by repeated, or even continuous, stimulation of that area. Following this initial stage, however, the response of the device is very much quicker and high levels of emission can be achieved even with very brief stimulation; it is an object of the present invention in a second aspect to provide apparatus by which this better response can be achieved much earlier after application of the unidirectional voltage.

According to the second aspect of invention there is provided display apparatus wherein it is arranged that the electroluminescent-embedded layer of an image-retaining device is submitted transitorily to high-level irradiation while unidirectional voltage is applied across it. This causes light, to be emitted from the layer, and the applied voltage is then reduced transitorily to cause the emission of this light to cease.

The invention in the latter aspect is based on the discovery that the initial stage of slow response of the image-retaining device can be substantially eliminated if the layer is submitted to high-level irradiation at the commencement of the period of operation; the high-level irradiation appears to have the effect of concentrating into a very short period the energy build-up required for efficient operation of the device. The light-emission that results from the high-level irradiation is caused to cease by the reduction in applied voltage, and so in this way the device can be quickly primed ready for efficient retention and display in response to subsequent irradiation.

The reduction of the applied voltage may be effected by switching a resistance into series-circuit with the device transitorily. In particular, means may be provided to respond to the circumstances in which the application of voltage to the device is re-established after any interruption thereof, to energize transitorily a lamp that is arranged to flood the said layer with light, and then to switch the resistance into the series-circuit for a short period.

The invention is of especial value in those circumstances, such as described in the above-mentioned patent application, where display apparatus including an image-retaining device is provided in a radar or other echo-responsive system on a ship or other moving craft, to retain and display target-information received throughout successive intervals of, for example, three, six or twelve minutes, voltage applied to the device being interrupted transitorily at the end of each interval so as to erase the retained information and thereby prepare the device for commencement of the next. By use of the present invention to prime the device following each interruption, it is possible to enhance significantly the record of target-information provided by the device during each interval.

BRIEF DESCRIPTION OF THE DRAWINGS

A radar system that includes apparatus in accordance with the present invention, will now be described, by way of example, with reference to the accompanying drawings, in which:

FIG. 2 is a sectional side elevation of an image-retaining panel used in the system of FIG. 1; and FIG. 3 is illustrative of the mounting arrangement of the image-retaining panel in the system of FIG. 1.

DESCRIPTION OF THE PREFERRED EMBODIMENTS

Figure 1:
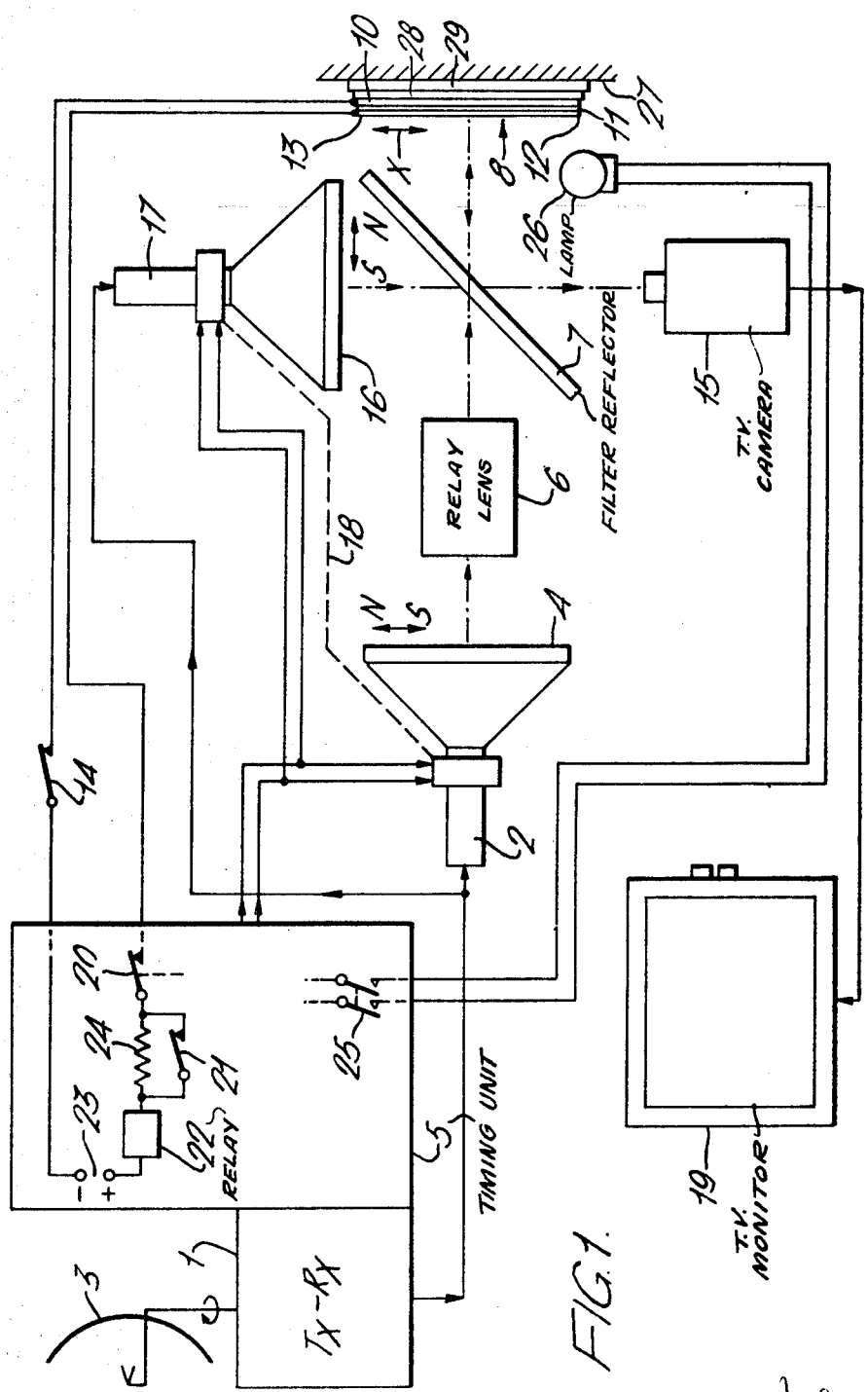
FIG. 1 is a schematic representation of the radar system.

The radar system to be described is for use on a ship to provide a display that is of assistance in navigation.

Referring to FIG. 1, a radar transmitter-receiver 1 supplies to a cathode-ray display-tube 2 video signals corresponding to radio-frequency echo-signals that are received by an aerial 3 of the system. The aerial 3 rotates to receive echo-signals from all directions in azimuth, and the tube 2, in accordance with the video signals supplied to it sequentially by the transmitter-receiver 1, provides on its screen 4 an intensity-modulated plan-position display of the received echo-signals. A timing unit 5 associated with the transmitter-receiver 1 supplies to the tube 2 signals that produce at the screen 4 the rotating, and appropriately-synchronized, radial time-base required to produce such display of the sequentially-applied video signals.

The display on the screen 4 is exposed through a relay lens-system 6 and a partially-transparent reflector 7 to an image-retaining panel 8 that is of a form sold by Thorn Electrical Industries Limited. This form of image-retaining panel is described in a paper entitled "The Image Retaining Panel", by A. S. Henderson, published in the journal "New Scientist", Volume 16, pages 686 to 688, and also in a paper entitled "Studies of the mechanism of the Thorn image-retaining panel" by G. F. J. Garlick, R. Harvey, P. J. Clewer and P. W. Ranby, published in the British Journal of Applied Physics, 1969, Series 2, Volume 2, and, as shown in detail in FIG. 2 of the drawings accompanying the present specification, includes a metal substrate 10 that carries two superimposed vitreous-enamel layers 11 and 12. The uppermost layer 12 is embedded with an electroluminescent phosphor (basically zinc cadmium sulphide) and is coated with an electrically-conductive transparent film 13. Unidirectional voltage derived within the timing unit 5 is applied between the substrate 10 and film 13 being (film 13 positive with respect to substrate 10) via a switch 14, and under these conditions irradiation of any area of the layer 12 with light, causes a yellowish glow to build up in that area in proportion to the intensity and duration of the irradiation. The emission of light is sustained after irradiation ceases, so the panel 8 has an effective memory by which it retains any image to which it is exposed. The image is retained in this way without any serious deterioration in sharpness and contrast, for a period of many minutes, provided the application of the unidirectional voltage is not interrupted; if there is interruption of the applied voltage for even a millisecond or so, the image is no longer retained. The switch 14 is normally maintained closed to apply unidirectional voltage to the panel 8 without interruption.

Referring more particularly to FIG. 1, exposure of the panel 8 to the screen 4 via the lens system 6 and reflector 7 causes the panel 8 to retain, and itself display, an image of the plan-position display provided by the cathode-ray tube 2. The retained image as reflected by the reflector 7 is scanned by a television camera 15. In this the camera 15 scans the reflected image as superimposed on the image transmitted through the reflector 7 from screen 16 of another cathode-ray tube 17. The display on the screen 16 is in essence a duplicate of the intensity-modulated plan-position display provided on the screen 4, the same video and synchronizing signals as supplied to the cathode-ray tube 2 being supplied to the cathode-ray tube 17 from the transmitter-receiver 1 and timing unit 5. The rotating time-base of each cathode-ray tube 2 and 17 is produced using a rotating deflection-coil assembly and precise synchronization is in this respect achieved using a direct mechanical connection 18 between them.

The video signals derived by the camera 15 from the superimposed display-images in the reflector 7 are supplied to a television monitor unit 19 (which may be one of a number of such units). The unit 19 has a large (for example twenty-three inch) television screen and provides a bright, high-contrast picture of the superimposed display-images that is clearly visible to the navigation officer of the ship even under normal daylight conditions. This picture, which may provide the radar information in black on a white background or vice versa, is a composite plan-position display of the radar-information currently applicable displayed on the screen 16, superimposed with the information retained by the panel 8. The panel 8 by virtue of its retention cumulatively of the currently-applicable information as this is displayed on the screen 4, builds up an historical record of target-movements within the area under radar-surveillance. Movement of a target appears in this record as a succession of dots that in general merge to form a line. This line in the composite display is headed by a dot that indicates the present position of the target, and (since it results from the most recently retained image displayed by the panel 8, superimposed with the same image displayed on the screen 16) is readily distinguishable from the other markings by its greater intensity. The direction along the line towards this particular dot is indicative of the direction of movement of the target, and the length of the line is indicative of the speed of target-movement (or at least, of the distance travelled in the relevant period).

The historical record provided by the panel 8 can be erased and restarted simply by opening the switch 14 and thereby interrupting the application of the unidirectional voltage to the panel 8. It is also arranged that the process of erasure and restarting is effected automatically; in particular, it is effected repeatedly at any selected one of a number of frequencies, for example, every three, six or twelve minutes, by automatically-controlled transitory opening of a set of normally-closed contacts 20 in the unit 5. The contacts 20 are connected in the unit 5 in series with a set of normally-closed contacts 21 and a relay device 22, to the positive pole of a unidirectional voltage source 23, and in this way control the application of voltage to the panel 8 via the switch 14 connected to the negative pole of the source 23.

The relay device 22 serves to control a priming operation that is performed whenever the application of unidirectional voltage from the source 23 is re-established to the panel 8, whether the interruption of this results from opening of the contacts 20 or of the switch 14, or from any other cause. In this respect the set of contacts 21 is shunted by a resistor 24, and the relay device 22, as well as controlling the set of contacts 21, controls a set of contacts 25 that in turn control energization of a lamp 26 positioned adjacent the panel 8. The relay device 22 holds both sets of contacts 21 and 25 closed, thereby shunting the resistor 24 and energizing the lamp 26, when current flow is first re-established in the circuit interconnecting the panel 8 with the source 23. The lamp 26 (which provides blue light substantially free from infra-red radiation) is energized to provide high-intensity light flooding the layer 12 of the panel 8, and this causes the panel 8 to draw maximum current (for example, thirty milliamps) producing a rapid build-up of energy and causing the layer 12 to be brought into light-emission. The device 22 holds the contacts 25 closed to energize the lamp 26 in this way for a short period only (for example, for one second), and following the opening of the contact 25 opens the contacts 21 momentarily (for example, for ten milliseconds) so as to introduce the resistor 24 and thereby reduce, but not interrupt, the voltage applied to the panel 8. Light emission from the panel 8 ceases once the light-stimulus provided by the lamp 26 ceases and the applied voltage has been reduced, but as soon as the contacts 21 close again to restore the full voltage, the panel 8 is then in a condition to retain and provide a bright display of the image from the screen 4 without any long period of build-up that otherwise would be necessary.

The characteristics of the image-retaining panel 8 are such that it draws current of only low value (current density of the order of 0.05 milliamps per square centimeter) upon application of the energizing voltage. No light is emitted by the panel at this time, and if the priming operation described above is not used, the panel continues to draw the low-value, 'dark' current until eventually there has been sufficient irradiation of the phosphor layer 12 to stimulate it to the 'dark' current-value; up to this point light is absorbed by the panel 8 without any apparent change in the current-flow and emission of light. Further irradiation now causes an increase in current and brings about emission of light that increases as the irradiation continues. The emission of light continues after irradiation is discontinued, the intensity decaying approximately exponentially with a time constant of several hours, so long as the existing voltage is maintained. Any further irradiation of the panel occurring during the decay causes an increase in the emission, but the rate of increase is now some four times faster than that for the initial build-up. The sensitivity of the panel to irradiation, expressed as the ratio of emitted-light intensity to irradiation, accordingly varies during operation, being some four times greater while the panel is in its 'decaying' state than when it is starting from an initial, unprimed state.

The priming operation performed in the system shown in FIG. 1 has the effect of putting the panel directly into the 'decaying' state of maximum sensitivity. The flash of high-intensity light raises the panel quickly to its maximum light emission, the current drawn rising quickly from the 'dark' value to a substantially higher value (current density of some 0.5 milliamps per square centimeter). After the flash of light the voltage applied to the panel is momentarily reduced to about a quarter of its normal value by the transitory switching-in of the resistor 24. This causes the emission of light from the panel 8 to cease, and leaves the panel in the same state as if the light had decayed over a long time. The panel 8 primed in this way, accordingly responds to subsequent irradiation with the higher sensitivity appropriate to the 'decaying' state, without any undesirable preliminary period at the lower 'dark' sensitivity.

The displays provided by the cathode-ray tubes 2 and 17 are compass-stabilized relative-motion displays, but the composite display obtained from superimposition of the display on the screen 16 with the display provided by the panel 8, shows the targets and the radar-carrying ship with superimposed 'tails' representing their true tracks. To this end, the panel 8 is moved transversely of the light path from the screen 4, in accordance with movements of the radar-carrying ship. More specifically, the panel 8 is mounted for movement in either sense along each of two coordinate directions over a platform 27, the panel 8 being fixed within a sub-frame 28 of a frame 29. The sub-frame 28 is confined to movement parallel to a coordinate direction X over the platform 27, whereas the frame 29 is confined to movement parallel to a coordinate direction Y that as shown in FIG. 3 is at right angles to the axis X.

Referring to FIG. 3, movements of the sub-frame 28 with respect to the frame 29 and of the frame 29 with respect to the platform 27, are controlled by actuators 30 and 31 that are energized in accordance respectively with signals representative of the North-South and East-West components of the ship's movement. These signals are derived (in the normal manner used where a true-motion display is provided) from a resolver R that is set from the ship's compass system C in accordance with the compass-heading or track of the ship and is supplied from the ship's log L with a signal representative of the ship's speed. The actuators 30 and 31 in response to the signals move the panel 8 relative to the platform 27, and consequently modify its registration with respect to the screen 4 in accord with the ship's true-motion.

The relative-motion display provided on the screen 4 is compass-stabilized to maintain the North-South direction parallel to the coordinate direction X. The radar-carrying ship in this display is represented as a stationary dot at the center of the screen 4, and the movements of the panel 8 across the platform 27 are made parallel to the axes X and Y in reverse senses, such that the consequent shift in registration of the panel 8 with this center is along the reciprocal of the ship's track. The panel 8 therefore retains true-motion information regarding the radar-carrying ship and all targets, and this is superimposed on the image at the reflector 7 of the display provided by the screen 16. This display, like that on the screen 2, is a relative-motion compass stabilized display, the North-South direction (as indicated adjacent screen 16 in FIG. 1) in this instance being perpendicular to both directions X and Y so as to achieve the appropriate coordination with the image of the panel-display as reflected from the reflector 7. Calibration and bearing rings, together with the heading line, are displayed on the screen 16, but not on the screen 4, to appear with the target-information in the composite display as scanned by the television camera 15 and presented by the monitor unit 19.

The plan-position picture presented by the monitor unit 19 shows the radar-carrying ship as a dot that remains always at the center of the picture. As time passes, a 'tail' grows rearwardly from this dot at a rate dependent on the true speed of the ship and showing its true track. All targets are shown as dots with radial and angular displacements from the center in accordance with their current positional relationships to the radar-carrying ship. The range and bearing of any one of these targets from the ship is therefore obtainable directly from reference to the calibration and bearing rings appearing in the picture, and this also enables the rates of change of both range and bearing to be quickly appreciated. Furthermore, 'tails' grow rearwardly from all moving targets at rates appropriate to the true speeds of those targets and showing their true tracks. These true-track 'tails' enable the true speed and aspect (that is to say, the orientation with respect to the radar-carrying ship) of each moving target to be determined, and allow any changes in speed of course to be quickly detected. The points in the picture representing stationary targets such as buoys and the coast-line, do not have true-track 'tails' and are therefore easily distinguishable from the representations of moving targets. The movements of the panel 8 in accordance with the movements of the radar-carrying ship, serve always to realign the retained representations of stationary targets with their current representations on the screens 4 and 16, and so there is no smearing or blurring of these representations in the televised picture.

Resetting of the panel 8 on the platform 26, to realign the center of the panel 8 with the center of the display area, is carried out automatically whenever periodically the contacts 20 in the timing unit 5 are opened to erase and restart the historical recording provided by the panel 8.

In general it is convenient for the heading line as shown in the display provided by the monitor unit 19 to be maintained in alignment with the heading of the radar-carrying ship itself, that is to say, for the display to be "ship's head up", so that the picture may be the more easily related to the view of the targets that would be obtained from the ship itself. This may be readily accomplished in the present system by mounting the monitor unit 19 for at least partial rotation about a vertical or horizontal axis so that the whole unit 19 can be rotated by the navigation officer to effect the desired alignment. The electrical connections to the unit 19 involve simply a video-input cable (shown in simplified form in FIG. 1) and a power-supply cable (not shown), and there is accordingly no great difficulty associated with mounting the unit 19 for rotation through, for example, some 365 or 400°. As an alternative, however, the camera 15 may be rotatably mounted about its viewing axis. In either case the necessary rotation to maintain the "ship's head-up" relationship may be effected automatically under control of the compass system.

The image-retaining panel 8, although itself emitting yellowish light (wavelength 6,000 Angstrom units), has maximum sensitivity to blue light (wavelength 4,500 Angstrom units), and this fact accordingly leads to the choice of a blue-phosphor tube for the cathode-ray tube 2. The fact that there is a difference in wavelength between irradiation and emission of the panel 8, is however used to improve the efficiency of the optical arrangement. In this latter respect the reflector 7 is provided by a wideband optical-interference filter (such as sold by Barr and Stroud Limited) that transmits the blue light emitted by the tube 2, but reflects the yellowish light emitted by the panel 8. The use of a filter in this way clearly influences the choice of cathode-ray tube to be used as the tube 17, and in this respect a tube with blue-orange emission characteristics is preferred. The tube 17, necessarily has a long persistence in order that the plan-position picture shall remain visible throughout the complete time-base rotation. The same requirement for persistance does not apply, however in relation to the tube 2, all the retention necessary being provided by the image-retaining panel 8, and so the choice for tube 2 can be made simply with the object of obtaining the maximum intensity of light-output.

From experience it appears that there is sufficient distinction in the display provided by the panel 8 itself, to enable the present position of targets to be distinguished from their previous position. In these circumstances therefore the tube 17 providing the same display of the target-information as the tube 2, may be dispensed with; the display of calibration and bearing rings and of the heading line, and also of an adjustable cursor line, can be achieved simply using one or more suitably-mounted and -illuminated screens at the position of the screen 16 shown in FIG. 1. The tube 17 can however be retained and utilized to display alpha-numeric information that it is wished to superimpose on the monitor-display. In addition, the mounting arrangement of the panel 8 may be carried on a mounting that is rotatable about an axis normal to the plane of the coordinate directions X and Y, and may then be driven about this axis by the compass system of the ship so as to achieve automatically a ship's-head-up display on the panel 8 itself; this avoids the need for rotation of the monitor unit 19 or camera 15 as referred to in the preceding paragraph.

Although in the system described above with reference to FIG. 1, target-information is written on the panel 8 during each complete sweep of the rotating time-base, this is not necessarily so, and it may be found advantageous, for example in reducing clutter in the resultant display, to suppress from the screen 4 target-information occurring in, say, alternate sweeps.

The present invention has been described above in relation to a radar system, and although it is of particular merit in this context, it is to be understood as being of wider application than this. For example it may be applied to display arrangements of sonar systems, and in more general areas where information is to be displayed.

We claim:

1. Information display apparatus comprising display means for providing a time-variable display-representation in accordance with input information, an image-retaining electroluminescent device operative to provide a retained light-pattern display in the image of light incident on a surface thereof, means mounting the image-retaining device in a location to receive light from the said display means in the image of said time-varying display-representation, said mounting means mounting said image-retaining device in said location with said surface exposed to the light from the said display means whereby said image-retaining device retains in display from said surface a cumulative time-integrated image of said display-representation, and viewing means operative concurrently with the exposure of said surface to the light from the display means to exhibit said cumulative time-integrated image displayed from said surface, said viewing means comprising light-receiving means directed to receive from said location light in the image pattern display there from said surface of the image-retaining device, and means for presenting from the light-pattern received by said light-receiving means a display dependent on said information as both currently and previously applicable.

2. Information display apparatus according to claim 1 wherein said display means for providing the time-variable display-representation includes a cathode-ray tube.

3. Information display apparatus according to claim 1 including lens means for projecting said time-variable display-representation onto said surface of the image-retaining device in said location.

4. Information display apparatus according to claim 1 including partially-transparent reflector-means inserted in both the path of light emitted by said display means and the path of light emitted by said image-retaining device to separate the light emitted from the image-retaining device from that of the display means.

5. Information display apparatus according to claim 1 wherein said viewing means includes television-camera means for scanning the said cumulative time-integrated image displayed by said image-retaining device to derive television video-signals in accordance therewith.

6. Information display apparatus according to claim 1 wherein said image-retaining device includes a layer of ceramic material having an extended surface embedded with electroluminescent material, and electrodes for applying unidirectional voltage across the layer, and wherein the said mounting means is means to mount the image-retaining device with said surface exposed to the display-representation provided by said display means.

7. Information display apparatus according to claim 6 including means for priming said image-retaining device to a high-sensitivity state upon application of unidirectional voltage across said layer, said priming means comprising means for subjecting said layer transitorily to high-level irradiation to cause initial emission of light from said layer, and means for transitorily reducing the applied voltage to cause said initial emission of light to cease.

8. In display apparatus including an image-retaining device that has a pair of electrodes, a layer of material interposed between the electrodes, said layer containing electroluminescent material and having the characteristic while unidirectional voltage is applied between the said electrodes of emitting light in dependence upon earlier irradiation of the layer: means for priming said image-retaining device into a high-sensitivity state, said priming means comprising first means operable to subject said layer to high-level irradiation transitorily so as to cause early initial emission of light from said layer, and second means responsive to operation of said first means for transitorily reducing the applied voltage to cause initial emission of light to cease.

9. Display apparatus according to claim 8 wherein said second means comprises means for switching resistance transitorily into series circuit with said electrodes.

10. Display apparatus according to claim 8 wherein said priming means comprises lamp means energizable to flood said layer with light, electrical circuit means connected to said electrodes and operable to reduce transitorily voltage applied thereacross, and means responsive to the circumstances in which unidirectional voltage is re-established between said electrodes after interruption thereof, to energize said lamp means transitorily and then operate said circuit means to reduce the applied voltage as aforesaid.

11. Apparatus for displaying echoes received from objects within an area of surveillance, comprising display means to provide in accordance with the received echoes a display representation changing with time of the relative locations of the objects within the surveillance area, and image-retaining electroluminescent device operative to retain images of light patterns to which it is exposed and to emit light in accordance with the retained images, optical means for projecting the said display representation provided by said display means, means mounting the image-retaining device in a location for exposure to the projected display-representation to retain cumulatively and thereby display, superimposed images of the time-changing display-representation projected, and further means operative concurrently with exposure of the image-retaining device to the projected display representation to display to view the superimposed images retained by the image-retaining device, said further means including means directed to receive light emitted from said location, and means for providing a viewable display of said retained superimposed-images in accordance with the light received by the directed light-receiving means.

12. Apparatus according to claim 11 for use on a moving craft, including means to effect relative displacement between the display means and the image-retaining device in accordance with movement of the craft.

13. Apparatus according to claim 11 wherein said display means is means operative to provide a relative-motion plan-position display of said echoes.

14. Apparatus according to claim 11 wherein said further means includes television-camera means for scanning the superimposed images displayed by said image-retaining device to derive television video-signals in accordance therewith.

15. Apparatus according to claim 14 wherein said optical means includes partially-transparent reflecting means, and means mounting the television-camera means to scan the image-retaining device via the partially-transparent reflecting means.

16. Radar apparatus for use on a moving craft, comprising means for receiving echoes from objects within a region of radar surveillance, display means for providing a plan-position display of the received echoes, an image-retaining device having a light-emitting surface, said image-retaining device being operable electrically to retain images of light patterns to which it is exposed and to emit light from said surface with a distribution thereacross in accordance with the retained images, means for exposing said surface continuously to said plan-position display so that said image-retaining device retains cumulatively and thereby displays from said surface superimposed successive images of the plan-position display, means for effecting relative displacement between the display means and the image-retaining device in accordance with craft movement, and means for exhibiting said superimposed images displayed from said image-retaining device during exposure of said surface to said plan-position display.

17. Radar apparatus according to claim 16 including television-camera means to scan the said surface and derive television video-signals in accordance with the display provided from said surface, and at least one television-display means to provide a picture display in accordance with the video signals.

18. Radar apparatus according to claim 16 including television-camera means to scan said surface and derive television video-signals in accordance with the display provided from said surface, and wherein said means for effecting relative displacement includes means to move the image-retaining device with respect to both the display means and the television-camera means.

19. Apparatus comprising means for receiving echoes from objects within a region of surveillance, a cathode-ray tube having a screen and being operative to provide a display in accordance with the echoes received, an image-retaining electroluminescent device having a light-emitting surface, said image-retaining device being operable electrically to retain images of light patterns to which said surface is exposed and to emit light from said surface with a distribution thereacross in accordance with the retained images, lens means, means mounting the image-retaining device in a location for continuous exposure of said surface via said lens means to the display provided on the screen of the cathode-ray tube, television-camera means for scanning the said surface, and means mounting the television-camera means to scan said surface in said location so as to derive television video-signals in accordance with the light patterns emitted thereby during said exposure.

20. Apparatus according to claim 19 wherein said image-retaining device includes a layer of ceramic material embedded with electroluminescent material, and electrodes for applying unidirectional voltage across the layer.

21. Radar apparatus comprising means for receiving echoes from objects within a region of radar surveillance, a cathode-ray tube having a screen and being operative to emit from said screen light of a first wavelength in the image of a plan-position display of the received echoes, an image-retaining panel that includes electroluminescent material, said panel being operable electrically to retain a cumulative image of light patterns of said first wavelength to which it is exposed and to emit light of a second wavelength patterned in accordance with the cumulative image retained, lens means, means for exposing the panel via said lens means to the image of the plan-position display provided by said cathode-ray tube, filter means for separating out light of said second wavelength from light of said first wavelength, and television-camera means for scanning said panel via said filter means during said exposure of the panel to provide television video-signals in accordance with the retained cumulative-image emitted by the panel in light of said second wavelength.

22. Information display apparatus comprising display means for providing a time-variable display-representation in accordance with input information, said display means emitting light of a first wavelength in the pattern of said display representation, an image-retaining device operable to respond to light of said first wavelength incident on a surface thereof to provide retained emission from said surface of light of a second wavelength in the image of the incident light pattern, viewing means for receiving light of said second wavelength emitted from said surface to provide a display dependent on the emitted pattern of that light, means for projecting the display light-pattern of said first wavelength emitted by said display means onto said surface so that said image-retaining device retains a cumulative time-integrated image of said display-representation, and means operative concurrently with the imaging of the display light-pattern on said surface to convey to said viewing means light of said second wavelength emitted from said surface in the pattern of said cumulative time-integrated image.

23. Information display apparatus according to claim 22 including filter-reflector means mounted adjacent said surface to separate the light emitted by said surface from the light projected thereon, said filter-reflector means transmitting light of one of said first and second wavelengths and reflecting light of the other of said wavelengths.

24. Radar apparatus according to claim 23 including means for effecting relative displacement between the cathode-ray tube and the image-retaining panel.

* * * * *